(12) United States Patent
Stark et al.

(10) Patent No.: US 7,128,092 B2
(45) Date of Patent: Oct. 31, 2006

(54) SEPARATING ARRANGEMENT FOR TREATMENT OF FLUIDS

(75) Inventors: John Herman Stark, Wattenwil (CH); Hansjorg Wagenbach, Biel (CH); Paul Werner Straub, Frauenkappelen (CH)

(73) Assignee: DCT Double-Cone Technology AG (CH)

( * ) Notice: Subject to any disclaimer, the term of this patent is extended or adjusted under 35 U.S.C. 154(b) by 332 days.

(21) Appl. No.: 10/773,533

(22) Filed: Feb. 5, 2004

(65) Prior Publication Data

US 2004/0159357 A1  Aug. 19, 2004

Related U.S. Application Data

(63) Continuation-in-part of application No. 10/070,482, filed as application No. PCT/CH99/00403 on Aug. 31, 1999, now Pat. No. 6,701,960.

(51) Int. Cl.
*F03B 3/18* (2006.01)

(52) U.S. Cl. .............. 137/545; 137/565.01; 137/842; 137/888; 210/652

(58) Field of Classification Search .............. 137/544, 137/545, 565.01, 842, 888, 803; 210/652, 210/110, 257
See application file for complete search history.

(56) References Cited

U.S. PATENT DOCUMENTS

| | | |
|---|---|---|
| 2,677,389 A | 5/1954 | Jisha et al. |
| 3,556,409 A | 1/1971 | Johannisson |
| 3,656,495 A | 4/1972 | Noren |
| 3,912,470 A | 10/1975 | Fluckiger |
| 3,933,113 A | 1/1976 | Dornak, Jr. |
| 4,014,787 A * | 3/1977 | Shorr ................ 210/639 |
| 4,027,407 A | 6/1977 | Kiss |
| 4,041,984 A | 8/1977 | Morel |
| 4,190,537 A * | 2/1980 | Tondreau et al. ........... 210/98 |
| 4,367,140 A * | 1/1983 | Wilson .................. 210/110 |
| 4,542,775 A | 9/1985 | Beck |
| 4,625,744 A | 12/1986 | Arnaudeau |
| 4,917,151 A | 4/1990 | Blanchard et al. |

(Continued)

FOREIGN PATENT DOCUMENTS

CH   689722   9/1999

(Continued)

OTHER PUBLICATIONS

M.L. Hoggarth, "The Design and Performance of High-Pressure Injectors As Gas Jet Boosters," *Proceedings of the Institution of Mechanical Engineers*, vol. 185, No. 56/71, 1970-1971, pp. 755-765.

*Primary Examiner*—A. Michael Chambers
(74) *Attorney, Agent, or Firm*—Ostrolenk, Faber, Gerb & Soffen, LLP (57) ABSTRACT

An arrangement for separating a fluid from admixtures has at least a first and a second separation unit. The separation units are of the type using an increased pressure or pressure difference for their function and have improved performance with increased pressure. The second separation unit is supplied with the fluid by a pressurising pump device. The first separation unit furnishes fluid of reduced concentration of admixtures to the pressurising pump device. It is supplied with supply fluid having reduced, the same, or elevated concentration of admixtures, preferably either taken directly from an outlet of the pump device or from an outlet of the second separation unit for fluid of increased concentration of admixtures. Overall, the concentration of admixtures in the fluid supplied to the second separation unit is decreased, leading to an increase in overall performance.

10 Claims, 5 Drawing Sheets

U.S. PATENT DOCUMENTS

| | | | | |
|---|---|---|---|---|
| 5,158,683 A | * | 10/1992 | Lin | 210/651 |
| 5,250,182 A | * | 10/1993 | Bento et al. | 210/641 |
| 5,311,907 A | | 5/1994 | Houck | |
| 5,501,798 A | * | 3/1996 | Al-Samadi et al. | 210/652 |
| 5,797,420 A | | 8/1998 | Nowicki et al. | |
| 5,853,593 A | * | 12/1998 | Miller | 210/652 |
| 5,863,128 A | | 1/1999 | Mazzei | |
| 6,132,618 A | * | 10/2000 | Bass et al. | 210/652 |
| 6,331,253 B1 | * | 12/2001 | Schrive et al. | 210/652 |
| 6,427,724 B1 | | 8/2002 | Hua | |
| 6,428,705 B1 | * | 8/2002 | Allen et al. | 210/638 |

2003/0205526 A1  11/2003  Vuong

FOREIGN PATENT DOCUMENTS

| EP | 0599281 | 6/1994 |
|---|---|---|
| EP | 0612078 | 8/1994 |
| FR | 740179 | 1/1933 |
| FR | 2580191 | 10/1986 |
| NL | 6555 C | 10/1921 |
| NL | 6811379 | 2/1970 |
| WO | 99/08003 | 2/1999 |

* cited by examiner

SEPARATING ARRANGEMENT FOR TREATMENT OF FLUIDS

CROSS-REFERENCE TO RELATED APPLICATIONS

This is a continuation-in-part of U.S. application Ser. No. 10/070,482, now U.S. Pat. No. 6,701,960, filed on Feb. 27, 2002 and issued on Mar. 9, 2004, which is a United States national 371 filing based on PCT/CH99/00403, filed Aug. 31, 1999 which was published under PCT Article 21(2) in English.

BACKGROUND OF THE INVENTION

The present invention relates to a separating arrangement for the treatment of fluids, namely separating admixtures.

Double-cone devices are described in the WO-A-87/01770 whose content is incorporated in this description by reference. The double-cone device, amongst other things, allows one to upgrade the available pumping pressure of a modest conventional pump. When incorporated in a compressor loop, such as proposed in the aforementioned patent, numerous novel possibilities become evident.

The double-cone device essentially is comprised of two cones which are connected by their ends of small diameter.

At the interface, i.e. interspersed between the entry cone and exit cone, an orifice is provided. In the region of the orifice, the double-cone device, if penetrated by a fluid, builds up a surprisingly low pressure which allows another fluid to be drawn into the device with high efficiency. When included in a closed loop with a pump, the pressure in this loop can be increased in that the double-cone unit sucks in fluid until an equilibrium is attained. The term fluid refers to both liquids and gases.

The double-cone device is characterized by the angles $\theta_1$ and $\theta_2$ of the conicity of the entry cone with respect to the exit cone:

$$F = (1 + \sin \theta_1)^2 * \sin^2 \theta_2$$

The quality function F should always be less than 0.11. The ranges are detailed hereinafter:

| F | Quality |
| --- | --- |
| <0.0035: | best |
| 0.0035–0.0155 | very good |
| 0.0155–0.0250 | good |
| 0.0250–0.0500 | satisfying |
| 0.0500–0.1100 | still sufficient |
| >0.1100 | poor |

One application where fluids must be pressurized, are reverse osmosis plants where admixtures are separated from a fluid, e.g. salt from water. However, other separation devices than reverse osmosis units, like cyclones, require a pressurized fluid as the working medium, too.

Generally, these separation units or devices need a certain throughput of the working medium to work properly over long periods. For instance, reverse osmosis units have to be "flushed" by the working medium.

The known separation arrangements, particularly those comprising reverse osmosis units, secure the required fluid throughput by additional measures like overdimensioned pumps, leading to a reduced overall performance.

SUMMARY OF THE INVENTION

Hence, it is an object of the present invention to propose a separating arrangement for fluids having constituents in admixture with improved performance.

Such a separating arrangement is disclosed and claimed herein. The specification and claims define preferred embodiments and uses of the arrangement.

Accordingly, a separation unit needing a pressure difference, e.g. a reverse osmosis unit, or a pressurized working fluid for its function or for improved performance, is penetrated by a pressurised fluid. The exit fluid leaving the separation unit in which the concentration of constituents to be separated is increased, is supplied to another separation unit, where a mass exchange with e.g. fresh liquid occurs. In this separation unit, due to the content of undesired constituents in both fluids, the fresh fluid is diluted by purified fluid extracted from the pressurized exit fluid. Thereby, the overall performance of the separation process is increased and a high level of fluid throughput is maintained.

BRIEF DESCRIPTION OF THE DRAWINGS

The invention will be described referring to Figures.

DESCRIPTION OF PREFERRED EMBODIMENTS

Before defining the source of the problems, it is necessary to describe the functioning of the double-cone device and the basic compressor loop. The original patented double-cone device and the basic compressor loop are presented in FIGS. 1 and 3, respectively. These schematics will be used to describe their mode of functioning.

Figure 1:
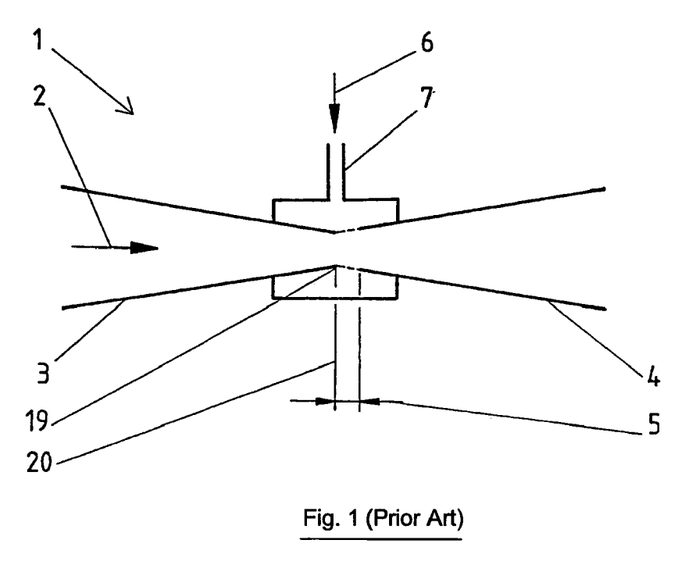
FIG. 1 Schematic illustration of a known double-cone device.

Referring to FIG. 1, the double-cone device 1 is fed with a feed flow 2 that enters the entry cone 3 and discharges into the exit cone 4. As the feed flow crosses the gap 5, material 6 may be drawn into the inlet 7 and, consequently, into the exit cone 4. The inlet flow rate is dependent on a number of parameters including geometrical ones as well as the feed flow rate and the external pressures at the inlet and downstream of the exit cone.

The conicity $\theta_1$ is the angle 8 between the walls of the entry cone 3, the conicity $\theta_2$ is the angle 9 of the walls of the exit cone 4.

Figure 3:
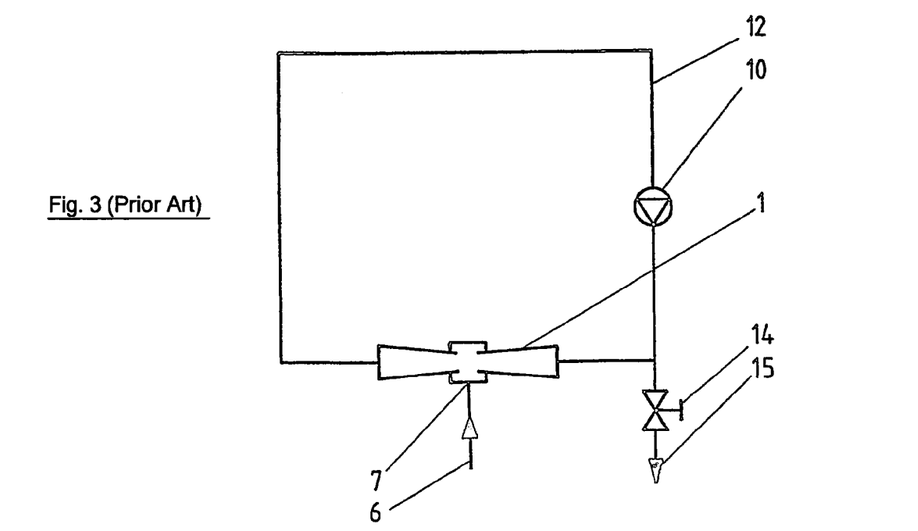
FIG. 3 Scheme of a known use of a double-cone device in a closed loop.

The basic compressor loop, which we will refer to as a double-cone technology (DCT) pump, is presented in FIG. 3. The pump 10 circulates liquid through the double-cone device 1 and round the main loop 12. Material enters the double-cone inlet 7 and causes a pressure rise within the main loop 12. This system pressure P is adjusted via the regulating valve 14 which controls the outlet flow 15 from the main loop 12.

The first problem stems from the geometry of the double-cone device 1. On progressively increasing the amount of material drawn into the device, a level is reached where the double-cone starts to destroy itself. The destruction takes the form of material torn out of the wall downstream of the entry to the exit cone. This damage renders the double-cone device inefficient and excessively noisy.

The basic double-cone device as presented in the WO-A-87/01770 is reproduced in FIG. 1. It is seen that the orifice 19 lies on the inlet plane 20. By moving this inlet plane 20 downstream of the orifice 19, as displayed in FIG. 2, and respecting the double-cone geometry, the wear problem is virtually eliminated. Experimentally, it appears that the inlet material 6 drawn into the double-cone device 21 is not subjected to such an extreme stress and so the wall material is better able to resist. In order to achieve the same suction pressure as the original double-cone device more feed flow rate is required. However, the short diffuser 22 attached to the entry cone 3 of FIG. 2 also results in a lower pressure-drop across the complete double-cone device 21. Thus, for a given pressure-drop more feed flow can be achieved with the modified double-cone device 21. The net result is that a similar suction performance to that of the known double-cone device 1 may be obtained without the attendant cone damage. In fact, a lower pressure-drop is observed when comparing equivalent suctions.

Figure 2:
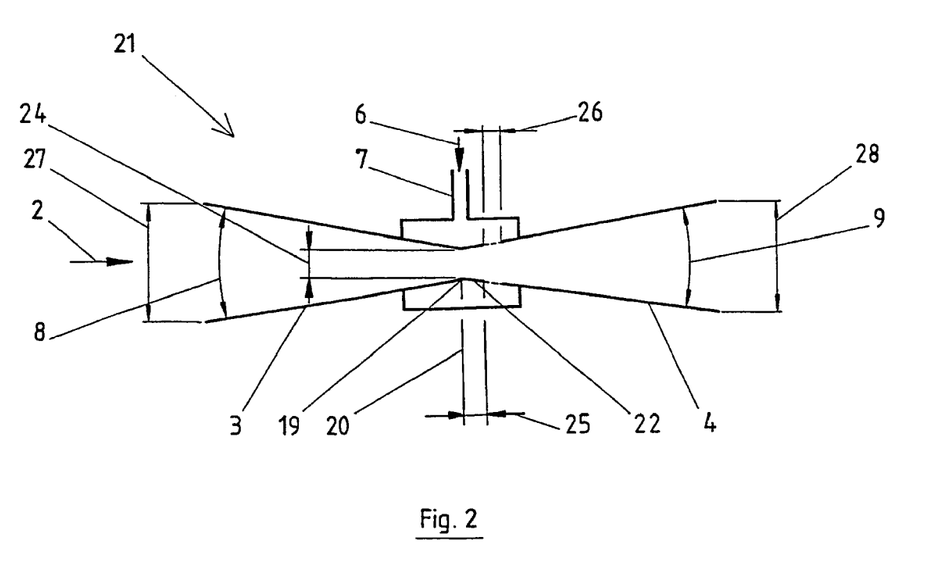
FIG. 2 Schematic illustration of a double-cone device according to the invention in a longitudinal section.

Referring to FIG. 2, the orifice diameter 24 is represented by d and the small diffuser length 25 by L. The ratio of L to d is critical for the performance of the modified double-cone device 21. Values of L/d greater than 0.1 display improved life expectancy and overall performance. As the ratio of L/d is increased, the overall pressure-drop across the modified double-cone device 21 decreases. In contrast, the maximum compressor pressure that can be achieved for a given feed flow rate decreases. The optimal trade-off occurs close to the value of L/d which yields just adequate compressor pressure for the available feed flow rate.

Other parameters for a particularly advantageous layout of the double-cone device are:

Ratio h/d of gap width h 26 to orifice diameter d 24: 0<h/d<3, preferably 0.5<h/d<2;

ratio $D_{in}/d$ of entry diameter $D_{in}$ 27 to orifice diameter d: 2<$D_{in}/d$<∞, preferably 5<$D_{in}/d$<20;

ratio $D_{out}/d$ of exit diameter $D_{out}$ 28 to orifice diameter d: 2<$D_{out}/d$<∞, preferably 5<$D_{out}/d$<20;

conicity $\theta_1$ 8 of entry cone: 0<$\theta_1$<10° (degree), preferably $\theta_1$<8° and even more preferably $\theta_1$<6°; and conicity $\theta_2$ 9 of exit cone: $\theta_2 \leq \theta_1$.

A direct comparison between the performances of the basic double-cone device 1 of FIG. 1 and the improved double-cone device 21 of FIG. 2 may be derived from the following results:

Working Conditions:

| Feed flow rate | 8 m³/h |
|---|---|
| Inlet flow rate | 1 m³/h |
| System pressure P | 35 bar |

Observation:

FIG. 1 device: Serious damage after only 20 minutes running time

FIG. 2 device: No damage apparent after 40 hours running time

In addition to the increased lifetime, the operating noise can be reduced by this measure.

As a consequence of the significantly improved characteristics of the double-cone device according to the invention, industrial applications are conceivable where high throughput at high pressure and a reasonable lifetime is necessary or at least advantageous. One such application is the purification of water containing unwanted components, particularly the desalination of sea-water by reverse osmosis.

Figure 4:
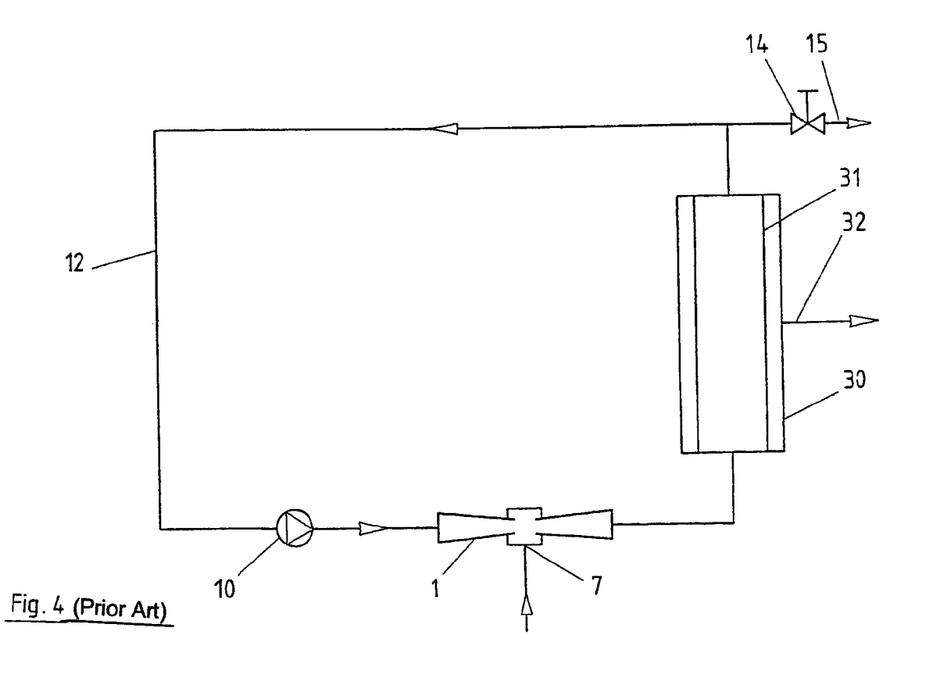
FIG. 4 Scheme of another known (first) closed-loop system using a double-cone device.

In a first approach according to FIG. 4, the reverse osmosis filter 30 may be directly inserted in the main loop 12. The purified fluid, e.g. desalinated sea-water, is recovered at the exit line 32 of the osmosis unit 30. Concentrated fluid leaves the main loop 12 via line 15 and valve 14. In this configuration, the solute concentration builds up progressively to a high stable level within the actual compressor loop. Consequently, the separation membranes 31 are required to reject a much higher solute concentration than the one which existed originally in the untreated inlet supply. This results in an impaired solvent yield. However, this layout of a purification system by reverse osmosis remains applicable, particularly under less demanding conditions, e.g. low concentrations of the matter to be separated.

The build-up of concentration within the compressor loop can be overcome by removing the separation membranes from the loop. This solution to the problem can introduce other difficulties because of the reduced membrane flushing.

Figure 5:
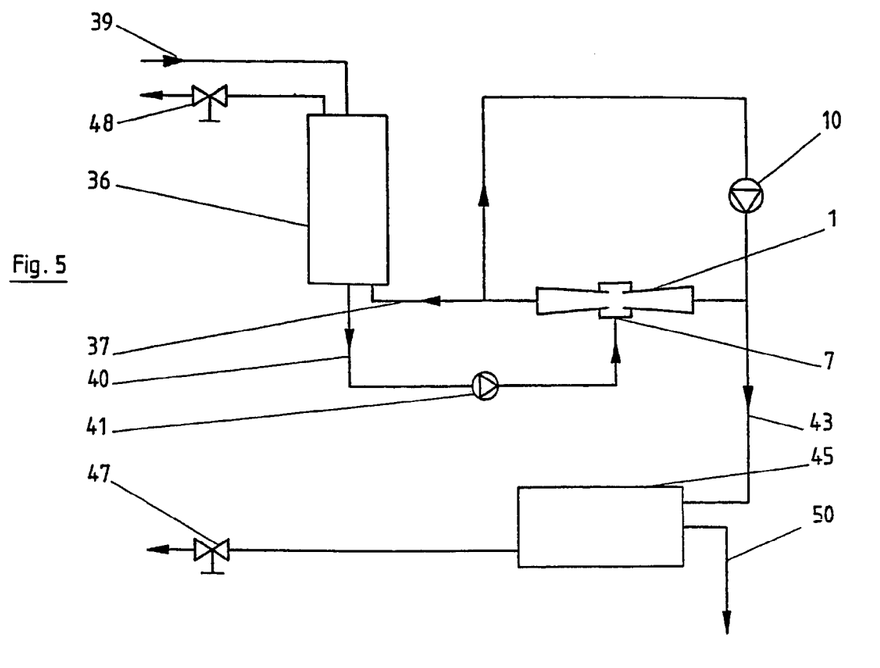
FIG. 5 Scheme of a second closed-loop system using a double-cone device.
Figure 6:
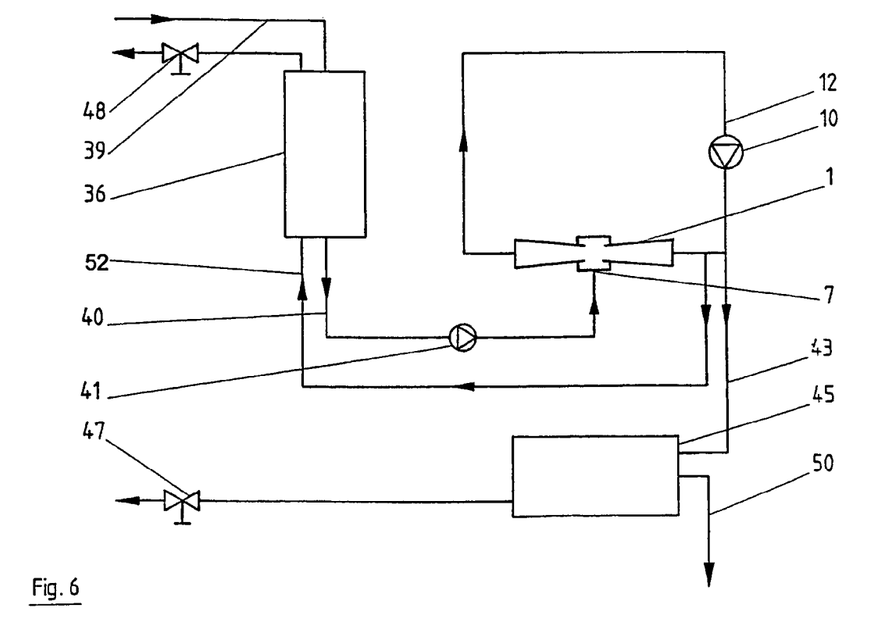
FIG. 6 Scheme of a third closed-loop system using a double-cone device.

Typically, when functioning at high pressures, one may assume that only some 10% of the main feed flow rate is available for supplying the separation membranes when placed external to the compressor loop. In FIGS. 5 and 6 of this patent application, a rearranged system is proposed that completely overcomes all these problems.

The schemes proposed in FIGS. 5 and 6 function according to the new principle of concentration reduction prior to entry into the DCT Pump. Referring to FIG. 5, the membrane of the entry osmosis unit 36 is supplied through line 37 on the higher pressure side of its membrane from the DCT pump downstream of the double-cone device 1. Liquid crosses the membrane and enters the supply stream 39, so the supply liquid in conduit 40 after the entry osmosis unit 36 is diluted. An optional feed pump 41 helps pressurise this stream at the inlet 7 to the double-cone 1. This additional pressure greatly enhances the performance of the DCT pump 10, both with respect to the system pressure and inlet flow capacity that can be achieved. The diluted supply stream leaves the DCT Pump on the high pressure side of the circulating pump 10 through conduit 43 and enters the exit osmosis unit 45. The system pressure is regulated by means of the two flow regulating valves 47 and 48 where the concentrate leaves the installation. The purified liquid is collected at the solvent outlet 50.

For many low, medium and high pressure membranes that are currently available, pressure cannot be applied to the lower pressure side of the membrane for fear of rupturing the unit. Typically, less than 0.5 bar is specified for most spiral wound reverse osmosis and nanofilter units. Thus the optional pump 41 cannot be placed before the entry osmosis unit 36 in FIG. 5.

The advantage of this optional pump 41 is evident from the following results:

| | |
|---|---|
| Hydraulic power of the optional pump relative to that of the circulating pump | 9% |
| Net gain in relative hydraulic power at outlet from DCT Pump | 50% |

The logic behind the concentration reduction is that the incoming supply stream 39 is sufficiently concentrated to permit an exchange through a membrane by reverse osmosis between itself and a highly concentrated stream feeding the higher pressure side of the membrane. For example, 35 bar of pressure should counterbalance the inherent osmotic pressure across a semi-permeable membrane that is associated with an NaCl salt concentration gradient of at least 35 g/l (grams per litre). This compensation should be sufficient whether the membrane separates sea water from fresh water or sea water from a 70 g/l brine solution. In practise it has been observed, for a specific choice of membrane in the osmosis unit 36, that sea water reaches the DCT Pump with concentrations as low as 13 g/l.

The main difference between FIGS. 5 and 6 is that in FIG. 6, the conduit 52 which supplies the volume of liquid to the higher pressure side of the membrane in osmosis unit 36, branches off downstream of the pump 10 and upstream of the double-cone device 1 so that the volume of liquid supplied to the entry osmosis unit 36 does not have to pass through the double-cone 1. As a result, the circulating pump 10 for the FIG. 6 installation will use less power than in the FIG. 5 installation. However, for certain cases the highest pressure possible is required for each set of membranes, which could favour the choice of the FIG. 5 installation.

Figure 7:
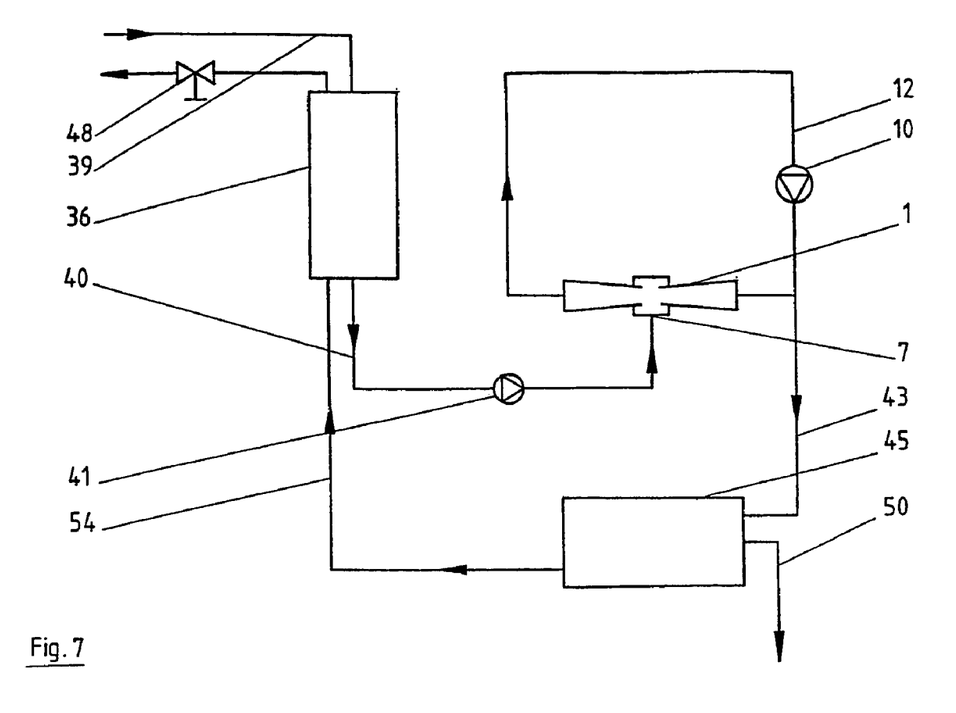
FIG. 7 Scheme of a fourth closed-loop system using a double-cone device.

The installation shown in FIG. 7 specifically solves the problem associated with the membrane flushing requirement.

The concentrate outlet of the exit osmosis unit 45 is connected to the entry osmosis unit 36 by the line 54. By so combining the concentrate lines from each block of membranes, the maximum volume of flushing liquid may be conserved. In addition, the membrane of osmosis unit 45 is able to function under more favorable conditions than those of the membrane of entry osmosis unit 36.

In applications, where the peculiar advantages of the DCT pump are not needed, any other suitable pump may be used.

Particularly, instead of the closed loop of conduit 12 with circulating pump 10 and double-cone device 1, a conventional pump or pump arrangement for creating the working pressure in the separation units 45, 36; 57 may be deployed.

Figure 8:
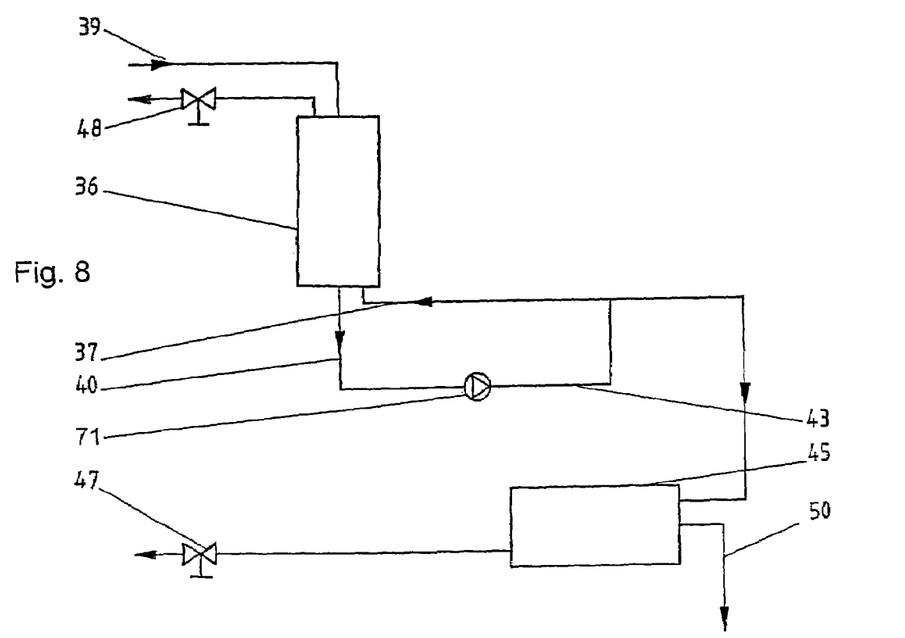
FIG. 8 Scheme of a first separating arrangement.
Figure 9:
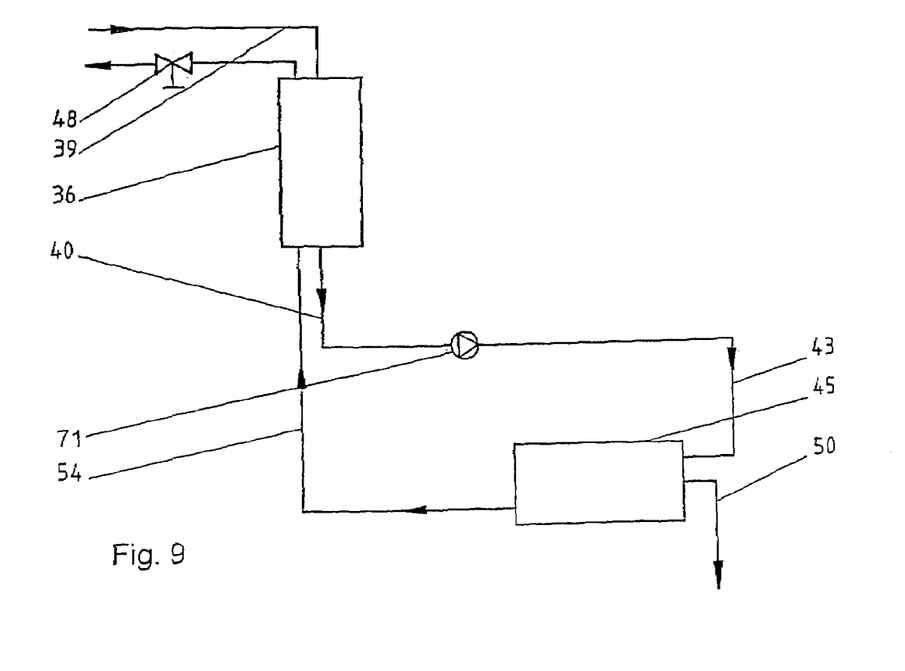
FIG. 9 Scheme of a second separating arrangement

FIG. 8 is a scheme of such a separating arrangement corresponding to the arrangements shown in FIGS. 5 and 6, and FIG. 9 is a scheme corresponding to the one of FIG. 7.

In FIGS. 8, 9, the feed pump 41 and the double-cone pump loop 1, 10, 12 are replaced by pump 71. The pump 71 may be a single pump providing the required feed flow and pressure difference. Of course, pump 71 may be constituted by a dual stage or multi-stage arrangement, e.g. of feed pumps and pressurising pumps. In this latter case, regarding FIG. 8, it is conceivable that a conduit like the conduit 37 branches off at an intermediate point within this pump arrangement.

The invention has been described by means of illustrative examples. However, the scope of protection relating to this invention is not restricted to the examples set forth but determined by the claims. One skilled in the art will be able to see numerous variants derived from the basic concept. Some such modifications are presented below:

The addition of a second variable gap, whose inlet plane coincides with the orifice, introduces the possibility of temporarily increasing the available suction.

The exit cone downstream of the gap can be sectioned so as to include several secondary gaps. In preference, each of these gaps is equipped with the possibility of partial or total closure. The secondary gaps can be chose with various heights and/or distances from the orifice.

The variable gaps, covering the range of fully open to closed, can be realised as follows:
   A section can be removed from the exit cone and a shutter ring used to vary or completely close the gap.
   A cut made through the exit cone and one part moved relative to the other.
   One or several holes can be introduced in the wall of the exit cone with the possibility of varying the opening by means of either a shutter, shutter rings or valves.

The double cone modifications proposed above can be introduced into the applications and installations depicted in the main text.

The installations for implementing the new application can comprise more than one double-cone device, separation unit or pump. In particular, the double-cones can be arranged in parallel or in series. The parallel arrangements sometimes require individual flow controlling devices for each branch.

Although the present invention has been described in elation to particular embodiments thereof, many other variations and modifications and other uses will become apparent to those skilled in the art. It is preferred, therefore, that the present invention be limited not by the specific disclosure herein, but only by the appended claims.

The invention claimed is:

1. Separating arrangement comprising a pressurising pump and separation units for separating from a supply fluid a fluid and components contained in admixture, the separation units being responsive to a pressure difference whereby the separation process has improved performance with increased pressure of the fluid, wherein:
   a first separation unit operable to receive the supply fluid,
   an input of the pump is connected to the first separation unit to receive from the first separation unit a diluted supply fluid with respect to the admixed components,
   an output of the pump is connected to a second separation unit for supplying the second separation unit with pressurised diluted supply fluid, and
   the first separation unit is connected to an outlet selected from the group consisting of an outlet of the second separation unit, which delivers fluid enriched with admixed component, and an outlet of the pump in order to supply the first separation unit with pressurised fluid of original or elevated components concentration, the first separation unit being further operable to separate components from the supplied pressurised fluid to produce a treated fluid and to add the treated fluid to the received supply fluid to produce the diluted supply fluid and to convey the diluted supply fluid to the pump input.

2. Separating arrangement according to claim 1, wherein the pump is defined by a fluidic loop comprising a loop conduit, a circulating pump and a double-cone device in a loop arrangement, the input of the pump being constituted by the an inlet of the double-cone device, and the outlet of the pump being constituted by a conduit branched off the loop conduit.

3. Separating arrangement according to claim 2, further comprising a feed pump connected with the inlet of the double-cone device in order to improve the supply of fluid to the double-cone device.

4. Separating arrangement according to claim 1, wherein the first separation unit allows a mass exchange between two fluids, the first separation unit being connected to the pump outlet and the input of the pump, so that a mass-exchange between the fluid exiting the pump and the fluid entering it through the first separation unit occurs so that the concentration of matter to be separated from the fluid is reduced in the entering fluid.

5. Separating arrangement according to claim 4, wherein the first separation unit is operable for separating matter from the fluid by a process selected from the group consisting of osmosis, reverse osmosis, filtration, cyclone effect, and chromatography.

6. Separating arrangement according to claim 1, wherein the second separation unit is operable for separating matter from the fluid by a process selected from the group consisting of osmosis, reverse osmosis, filtration, cyclone effect, and chromatography, in order to recover at least one of purified fluid and concentrated fluid at the exit of the second separation unit.

7. Separating arrangement according to claim 6, wherein the first separation unit is operable for separating matter from the fluid by a process selected from the group consisting of osmosis, reverse osmosis, filtration, cyclone effect, and chromatography.

8. Separating arrangement according to claim 1, wherein the first and second separation units are operable for the desalination of sea-water.

9. Separating arrangement according to claim 1, wherein the first and second separation units are operable for the separation of a contaminant from water.

10. Separating arrangement according to claim 9, wherein the contaminant is oil.

\* \* \* \* \*